Jan. 6, 1953   E. I. GHORMLEY   2,624,304
METHOD OF MAKING BAKING OR LIKE PANS
Original Filed July 6, 1948
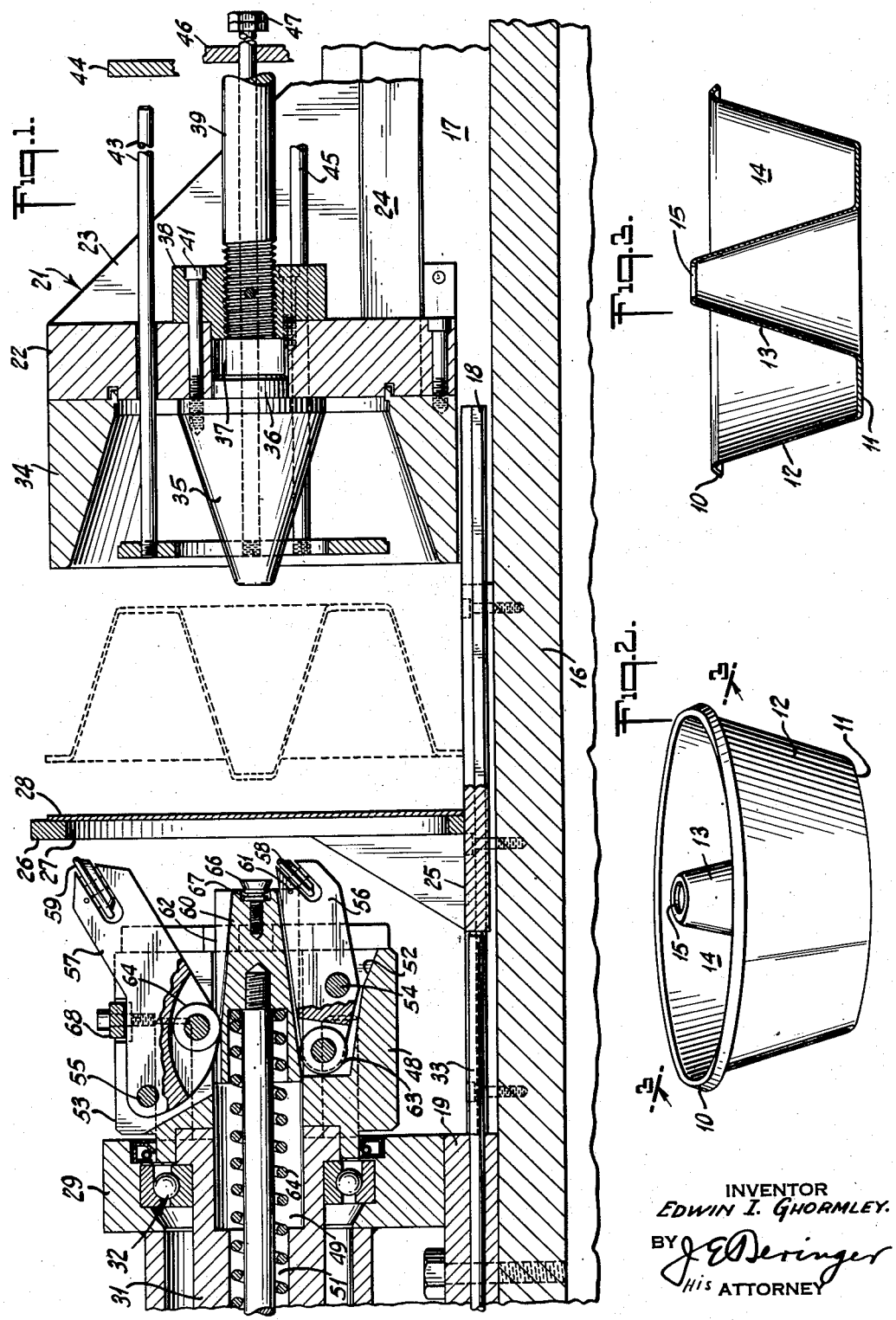
INVENTOR
EDWIN I. GHORMLEY.
BY J. E. Deringer
His ATTORNEY Patented Jan. 6, 1953

2,624,304

UNITED STATES PATENT OFFICE

2,624,304

METHOD OF MAKING BAKING OR LIKE PANS

Edwin I. Ghormley, Dayton, Ohio, assignor to United Aircraft Products, Inc., Dayton, Ohio, a corporation of Ohio Original application July 6, 1948, Serial No. 37,163. Divided and this application July 28, 1948, Serial No. 41,043

6 Claims. (Cl. 113—52)

This is a division of my application Serial Number 37,163, filed July 6, 1948, for Machine for and Method of Metal Working.

The present invention relates to methods of manufacture of baking and like pans. The invention has especial, although not limited, reference to baking pans characterized by a deep annular recess or cavity, for example to pans used in preparing angel food cakes.

Such pans have heretofore been made as fabricated articles, made up of two or more parts separately formed and connected together by a brazing or like process. This method, which involves multiple steps and handling, is time consuming and relatively expensive. Moreover, the resultant product lacks attractiveness of appearance and since it presents surface cracks and crevices is difficult to clean. Attempts to form unitary one-piece pans by drawing or on a punch press have been unsuccessful because elongation of the metal without tearing and without an irregular distribution of material has not been possible.

It is an object of the present invention to produce a one-piece pan of the class described, free of the objections above noted, by a method consistently yielding a product conforming to the design characteristics.

More specifically it is an object of the invention to utilize rotary extrusion pressure to form a pan of the class described in a single operation.

Another object is to shape a flat metal blank into a baking pan characterized by a deep annular recess, the side walls of which are of lesser thickness than the bottom; a related object in this connection being to promote a more uniform rate of heat exchange over the complete area of the pan in the interests of more rapid, efficient baking.

Other objects and details of the pan and method will appear from the following description, when read in connection with the accompanying drawings, wherein:

Fig. 1 is a fragmentary view in longitudinal section of a machine for carrying out the method of invention;

Fig. 2 is a view in perspective of a baking pan produced in accordance with the present invention; and Fig. 3 is a view in cross section, taken substantially along the line 3—3 of Fig. 2.

The invention is disclosed in connection with a baking pan but it will be understood that the method forming a part of the invention has a wider application in sheet metal working. Such method appears to present a generally new and better means of defining a deep annular recess in a piece of sheet metal, as compared to known prior art practice.

Referring to Figs. 2 and 3 of the drawings, a baking pan made in accordance with the present invention is a one piece unitary structure formed from a single piece of sheet metal, as will hereinafter appear. The pan comprises a rim portion 10, a bottom portion 11, an outer wall 12, and an inner wall 13. The rim 10 may originally lie in a plane parallel to the bottom 11 but during the forming process or as an additional step thereto is turned down as indicated. The walls 12 and 13 are spaced apart and interconnected by the bottom 11 and define therebetween a relatively deep annular recess or space 14. The walls are oppositely inclined relatively to each other in such wise that annular space 14 has a tapered formation extending from an area of minimum width adjacent the bottom 11 to an area of maximum width adjacent the rim 10. The inner wall 13 is centrally located with respect to wall 12 and projects as a frustoconical horn upward through and beyond the plane of the rim 10. The frustum of the horn or cone has an opening 15 cut therein and the base of the horn opens through the bottom 11.

The walls 12 and 13 are of lesser thickness than the rim 10, the bottom 11 and the frustum of the cone or inner wall 13; the relatively thin walls being reinforced and strengthened by the heavier sections of the pan. The construction and arrangement is such as to permit a more uniform and rapid rate of heat exchange. That is, heat applied directly to the bottom 11 and less directly to the walls 12 and 13 is transmitted to space 14 at approximately the same rate so that baking may proceed relatively quickly and at more nearly the same rate throughout the cake batter than is the case when the bottom and side walls are equally thick. Further, by the method of the invention it is possible to make the side walls 12 and 13 relatively steep and the space 14 deep, so that heat may be applied directly to a large area of the baking space 14.

The pan is shaped from a flat metal blank according to a rotary extrusion process by which both side walls 12 and 13 and interconnecting bottom 11 are formed in a single operation. A machine for carrying out such method is described and claimed in my parent application previously referred to.

The machine there described is in part shown herein in Fig. 1. As may be seen therein, the machine comprises a base 16 to which is secured a first set of guideways 17, a second set of guideways 18 and a plate 19. The guideways 17 provide a track support for an anvil assembly 21 including a block 22, an integral rib 23 and tenons 24 on the rib 23 slidably mounted in guideways 17. The guideways 18 provide a track support for a plate 25 upon which is mounted an upright blank holder 26. The holder 26 has a large central opening 27 therein and is adapted to retain in an upright position a flat metal blank 28 from which the baking pan is formed. The plate 19 provides a mount for a housing 29 in which a spindle 31 is rotatively arranged in bearings 32.

The anvil assembly 21 and the spindle housing 29 are mounted in opposed coaxial relation upon the base 16 and the blank holder 26 lies therebetween. The anvil assembly is reciprocable relatively to the guideways 17 toward and away from housing 29 while spindle 31 is rotative relatively to the housing 29 and to the anvil assembly. The blank holder 26 is resiliently urged in a right hand direction by means of a push rod 33 abutting plate 25 and extending through plate 19 to a resilient pressure source such as a spring or compressed air accumulator. The holder 26 moves under the control of the resilient pressure source and of the anvil assembly 21 and permits engagement and shaping of the blank 28 by the working parts through central opening 27 therein.

The anvil assembly 21 further comprises a first die member 34 circular in shape and secured to the front face of block 22 adjacent the periphery thereof, and a second die member 35 frustoconical in shape and secured to the front face of block 22 centrally thereof. The die 34 has a sloping inner wall corresponding in pitch and length to the outer wall 12 of the baking pan and provides the anvil upon which this wall of the pan is formed. The central die member 35 is externally dimensioned in accordance with the shape of the inner wall 13 of the pan and is the anvil upon which this wall is formed. Together the block 22, anvil 34 and anvil 35 define the die mold. The anvil or die member 35 has a locating projection 36 on the base thereof received in a central opening 37 in the block 32. Also received in the opening 37 on the opposite or rear face of the block 32 is a reduced diameter portion of a nut 38. The nut 38 is internally threaded for connection with a shaft 39 and is held to the block 22 by bolts 41. The shaft 39 extends rearwardly in a manner not here shown into cooperative relation with a hydraulic cylinder or like device whereby power initiated reciprocable motion may be imparted to the anvil assembly.

The anvil assembly additionally comprises an ejector ring 42 reciprocable within the space between anvil elements 34 and 35 and adapted to seat in the bottom of such space upon the front face of block 22. The ring 42 has a set of rods 43 anchored thereto and extending through the block 22 toward abutting engagement with a fixed stop 44 and has another set of rods 45 anchored thereto and extending rearwardly through block 22 toward cooperative engagement with a fixed stop 46, which stop may be integral with or the same part as stop 44. The rods 45 extend through and beyond stop 46 and have nuts 47 thereon arranged to limit against stop 46 in forward movement of the ejector ring. The construction and arrangement is such that when the anvil assembly moved in a forward, or left hand, direction as viewed in the drawing, ejector ring 42 is carried therewith until the nuts 47 on rods 45 engage stop 46. Thereafter the anvil assembly moves relatively to the ejector ring which is caused to assume a seated position adjacent block 42. When the anvil assembly moves on its return stroke, and in a right hand direction as viewed in the drawing, the ejector ring 42 moves in accompaniment therewith until the rods 43 engage stop 44 whereupon the continued motion of the assembly is accomplished relatively to the ejector ring. The controlled motion of the ejector ring is utilized, as the name implies, to aid in removing a finished pan from the die mold.

The spindle 31 projects at the inner or right hand end thereof through and beyond bearing 32. The outer or left hand end of the spindle is arranged to be connected to an electric motor or like device whereby the spindle may be rotatively driven. Secured to the inner end of the spindle is an enlarged head 48. The head 48 has a counterbore 49 communicating with a longitudinal bore 51 in spindle 31 and further is intersected radially by three sets of slots 52 and 53. The slots of each set 52 and 53 are spaced equidistant from one another about the front face of the head 48, and are arranged in alternating relation with respect to the slots of the other set. A pivot pin 54 and 55 is passed transversely through each slot 52 and 53 and pivotally mounted upon each pin 54 and 55 is a respective arm 56 and 57. The arms 56 and the arms 57 are slotted at their outer extremities and rotatably carry, in such slots, forming and pressing rolls indicated respectively at 58 and 59.

The presser arms 56 and 57 thus are arranged to revolve with the head 48 about the axis of spindle 31 and further are movable in rocking or rotative directions about the respective pivots 54 and 55. Rocking motion of the arms is initiated and controlled by a cam member 60 and reciprocable within counter bore 49. The cam member 60 has a plurality of longitudinal peripheral grooves 61 and 62 arranged in alternating spaced relation corresponding to the alternating positions of the arms 56 and 57. Rollers 63 on the arms 56 are received in grooves 61 while rollers 64 on the arms 57 are received in grooves 62. The grooves 61 and 62 taper toward the front end of cam element 60 to produce an oscillating motion of the arms 56 and 57 in response to reciprocation of the cam element. In the case of arms 56, the pivot pins 54 are placed intermediate the ends of the arms so that a forward or right hand direction of motion of cam element 60 produces a swinging motion of the outer ends of the arms toward the axis of spindle 31. In the case of arms 57, the pivot pins 55 associated therewith are placed at the inner ends of the arms so that a forward or right hand direction of motion of cam element 60 produces a swinging motion of the outer ends of the arms away from the axis of spindle 31. A backward or left hand direction of motion of the cam element 60 results in correspondingly opposite direction of movement of the arms 56 and 57. The cam element 60 is urged in a right hand or outer direction by a coil spring 64 disposed in bore 51 and mounted upon a guide rod 65 anchored to the rear of cam element 60. Upon the front end of cam element 60 is a friction plate 66 rotatable independently of element 60 by reason of an intermediate bearing 67. Radially outward swinging motion of the arms 57 is limited by respective stop bars 68 recessed into the periphery of head 48.

The blank holder 26 has a limited motion in the direction in which it is urged by push rod 33, which limit is defined by the extent of expansion permitted the resilient pressure source. During the forward motion of the anvil assembly, the anvil member 34 may engage holder 26 and move it rearwardly or in a left hand direction against the action of the resilient pressure force. During the retracting stroke of the anvil assembly the holder 26 follows the anvil 34 until its limit of motion in that direction is reached whereupon the anvil 34 moves away from the holder. The positions of the parts attained when the anvil assembly is at the end of its retracting stroke is indicated in Fig. 1, although this view is intended to show the assembly moving toward the work.

With the machine at rest, the parts assume approximately the positions shown in Fig. 1 wherein axial retracting motion of the anvil assembly has separated the anvil 34 from the blank holder 26 which stands at the limit of its outward motion. At this time, the cam element 60 is under the sole control of the spring 64 and accordingly stands in its farthermost outer position. In so moving, the cam has rocked the arms 56 in a convergent direction to move the rolls 58 thereon toward the axis of the head 48 and in line with the edge of the frustum of anvil 35. The arms 57 have been spread apart by cam 60 in a divergent direction to move the rolls 59 away from the axis of head 48 and in line with the inner edge of the land defining the start of the internal slope of anvil 34.

Preparatory to starting the working stroke of the machine, the sheet metal blank 28 is placed against the holder 14 on that side facing the anvil assembly. There is then set in motion the hydraulic cylinder operable upon shaft 39. The shaft 39 is moved thereby forwardly or in a left hand direction as viewed in Fig. 1, and, in the course of such movement, the frustum of anvil 35 contacts the metal blank 28. Continued motion of the anvil assembly thus serves to move the blank 28 and holder 26 toward the head 48 against the relatively low resilient pressure applied in opposition through rod 33. At or about the same time forward motion of the anvil assembly is initiated, rotary motion of the spindle 31 is begun. The arms 56 and 57 partake of such rotary motion and revolve in the planes indicated in Fig. 1 about the axis of the spindle. As the anvil assembly approaches the arms 56 and 57, the rolls 58 and 59 of the presser arms engage the metal blank 28, the first said set engaging the blank adjacent the center thereof and the second said set engaging the blank adjacent the periphery thereof. Under the influence of continuously applied axial pressure by the anvils, the blank 28 is forced by the presser arms to a seat upon the anvils. In response to further rotation of the presser arms, the metal of the blank is pressed against the sloping walls of the respective anvils 34 and 35 and caused to assume the formation defined by the anvils. At or about the same time that the rolls 58 and 59 on the presser arms engage the metal blank 28, the anvil 35 through the blank engages the friction plate 66 on cam element 60. Further axial movement of the anvil assembly accordingly results in a retracting or left hand direction of movement, as viewed in Fig. 1, of the cam element 60. The rollers 63 and 64 are enabled thereby to follow the descending slope of the grooves 61 and 62 in the cam with the result that the rolling and pressing pressure applied by the rolls 58 on the arms 56 is developed gradually outward from the axis of the spindle whereas the similar pressure applied by rolls 59 on arms 57 develops gradually inward. The motion of the presser arms under the action of cam 60 is keyed to the slope of the anvils 34 and 35 in such wise that the rolls 58 and 59 follow the contour of the anvils and press the metal of the blank closely against the sloping walls thereof. The forward motion of the anvil assembly is limited by suitable means operable to interrupt the stroke thereof when the rolls 58 and 59 on the presser arms have reached the bottom of the annular recess between anvils 34 and 35.

It will be observed that the action of the presser arms is such as to be without effect on that area of the metal blank which is not engaged by the arms. This area, which is annular in shape, separates the shaped walls of the blank and defines the bottom 11 of the baking pan produced by the operation. That area of the metal blank acted upon by arms 56 conforms to the shape of the frusto-conical anvil 35 and is caused thereby to assume a corresponding shape and this area accordingly becomes the central cone 13 of the pan. The area of the metal blank acted upon by arms 57 is made to conform to the slope of the internal wall of anvil 34 and this area of the blank accordingly becomes the side wall 12 of the pan. The area of the metal blank resting upon the end of anvil 34 is clamped between such land and the holder 14 and becomes the rim of the pan and may lie parallel to the bottom. It will be further noted and understood that the action of the rolls 58 and 59 against the counterpressure applied by the anvils 34 and 35 is such as to draw or extrude the metal acted upon without adding to or taking away from the metal of the rim and of the bottom. In consequence, and as seen in Fig. 3, the outer wall of the pan and the central cone thereof are relatively thinner than the rim and bottom portions of the pan.

When the pan has been so formed in the die mold, a retracting stroke of the anvil assembly is initiated and rotary motion of the spindle 31 may be discontinued. The anvils 34 and 35 accordingly move away from the presser arms 56 and 57 and return to the position shown in Fig. 1. The blank holder 26 follows the return motion of the anvils until the limit of its motion is reached whereupon the anvils continue on independently of the holder. The distance of retraction of the anvil assembly and the limit placed upon the following motion of the holder 26 is such as to provide at the end of the return stroke of the anvils, a space of sufficient width between the anvils and the holder 26 as to permit withdrawal of the finished pan from the machine.

What is claimed is:

1. The method of forming a baking pan from a flat metal blank, said pan having spaced apart inner and outer walls defining an annular recess therein, including the step of applying separate spaced rotary extrusion pressures respectively to define said inner and outer walls, such pressures being applied to one side of the blank beginning at the top of the recess and ending at the bottom thereof.

2. The method of forming a baking pan from a flat metal blank, said pan having spaced apart oppositely inclined inner and outer walls defining an annular recess therein, comprising the steps of applying separate spaced rotary extrusion pressures respectively to define said inner and outer walls, such pressures being applied to one side of the blank, and gradually developing such pressures respectively inward and outward of the axis of the blank.

3. The method of forming in a flat metal blank a relatively deep annular recess having oppositely sloping side walls, comprising the steps of applying separate spaced concentric rotary extrusion pressures respectively to define said inner and outer walls, to one side of said blank, and gradually developing such pressures respectively inward and outward of the axis of the blank.

4. A method of making a one-piece sheet metal baking pan characterized by a frustoconical central wall and an oppositely inclined outer wall, including the steps of forming a flat metal blank, simultaneously applying separate rolling and pressing pressures to said blank on one side thereof, one of said pressures being applied adjacent to the center of the blank and developing gradually outward thereof and the other of said pressures being applied outward of the center of the blank and developing gradually inward thereof, and applying a counterpressure to the opposite side of the blank.

5. A method of making a one-piece sheet metal baking pan characterized by a frustoconical central wall and an oppositely inclined outer wall including the steps of forming a flat metal blank, applying a rolling and pressing pressure to one side of said blank adjacent the center thereof and gradually developing such pressure outward, simultaneously applying a similar pressure to the same side of said blank outward of the center and gradually developing such pressure inward, and effecting a relative axial motion between said metal blank and the pressure applying devices during the application of such pressures.

6. A method of making a metal baking pan characterized by a central frustoconical wall and an oppositely inclined outer wall, including the steps of forming a flat metal blank, applying an axial rolling and pressing pressure to one side of the metal blank adjacent the center thereof and gradually developing such pressure outward, simultaneously applying to the same side of said blank a similar pressure outward of the center of the blank and gradually developing such pressure inward, applying a counterpressure to the opposite side of the blank, the pressures being applied in a manner to extrude the metal acted upon, and limiting the duration of the application of such pressures to leave an annular area in the blank between and interconnecting the areas subjected to the rolling and pressing pressures, said annular area defining the bottom of the pan and having a thickness greater than the thickness of said other areas which define the walls of the pan.

EDWIN I. GHORMLEY.

REFERENCES CITED

The following references are of record in the file of this patent:

UNITED STATES PATENTS

| Number | Name | Date |
|---|---|---|
| Re. 19,790 | Lindgren | Dec. 17, 1935 |
| 635,320 | Hendricks | Oct. 24, 1899 |
| 1,262,780 | Griffin | Apr. 16, 1918 |
| 1,732,554 | Detwiler | Oct. 22, 1929 |
| 1,903,310 | Launderville | Apr. 4, 1933 |
| 1,922,087 | Hiester | Aug. 15, 1933 |
| 1,953,934 | Hiester | Apr. 10, 1934 |

FOREIGN PATENTS

| Number | Country | Date |
|---|---|---|
| 116,777 | Switzerland | Nov. 1, 1926 |
| 117,965 | Switzerland | Dec. 1, 1926 |
| 515,445 | Germany | Dec. 28, 1926 |
| 663,139 | France | Mar. 30, 1929 |
| 26,756 | Australia | July 8, 1930 |
| 33,330 | Netherlands | July 21, 1930 |